United States Patent [19]

Takagi

[11] Patent Number: 5,063,407
[45] Date of Patent: Nov. 5, 1991

[54] METHOD AND APPARATUS FOR RECORDING IMAGE

[75] Inventor: Atsushi Takagi, Kanagawa, Japan

[73] Assignee: Fuji Photo Film Co., Ltd., Kanagawa, Japan

[21] Appl. No.: 630,652

[22] Filed: Dec. 20, 1990

[30] Foreign Application Priority Data

Dec. 21, 1989 [JP] Japan .................................. 1-332208
Dec. 21, 1989 [JP] Japan .................................. 1-332209

[51] Int. Cl.$^5$ ............................................. G03B 27/80
[52] U.S. Cl. ......................................... 355/68; 355/77
[58] Field of Search .............................. 355/38, 68, 77

[56] References Cited

U.S. PATENT DOCUMENTS 4,176,946 12/1979 Takahashi ............................ 355/38
4,244,655  1/1981 Asai et al. ......................... 355/38 X
4,769,695  9/1988 Terashita ............................ 355/38

Primary Examiner—L. T. Hix
Assistant Examiner—D. Rutledge
Attorney, Agent, or Firm—Sughrue, Mion, Zinn, Macpeak & Seas

[57] ABSTRACT

A method of image recording comprises the steps of performing photometry on a plurality of pixels into which an original film is divided, calculating the large-area transmittance density (LATD) of said original film on the basis of the photometric values for individual pixels, designating the main area of said original film, calculating the average transmittance density of the designated main area on the basis of said photometric values, determining conditions of exposure as appropriate for said original film on the basis of a linear relationship between said LATD and the average transmittance density of the main area, and performing imagewise recording on a light-sensitive material under the thus determined appropriate conditions of exposure. Using this method, even an unskilled operator is capable of reproducing the image of a principal subject such as a human figure or his/her face to provide an optimum density in an easy and precise manner. Also, an apparatus for image recording applies this method to test printing and needs only a single run of test printing to determine optimum conditions exposure for producing an enlarged print or an ultra-high quality image.

12 Claims, 8 Drawing Sheets

FIG. 3a
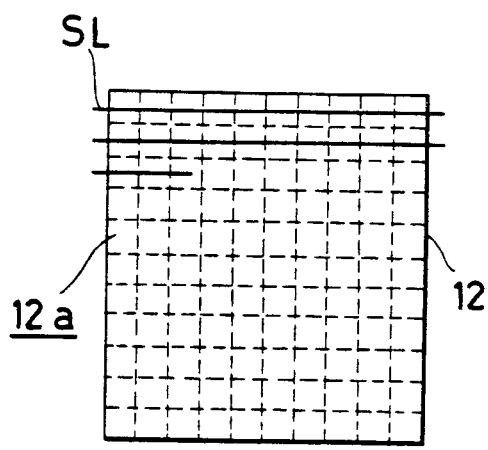
FIG. 3b
FIG. 4
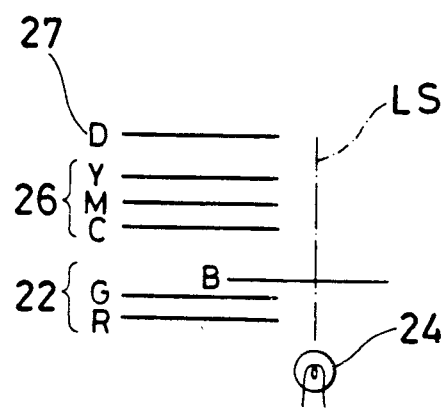

F I G. 5a
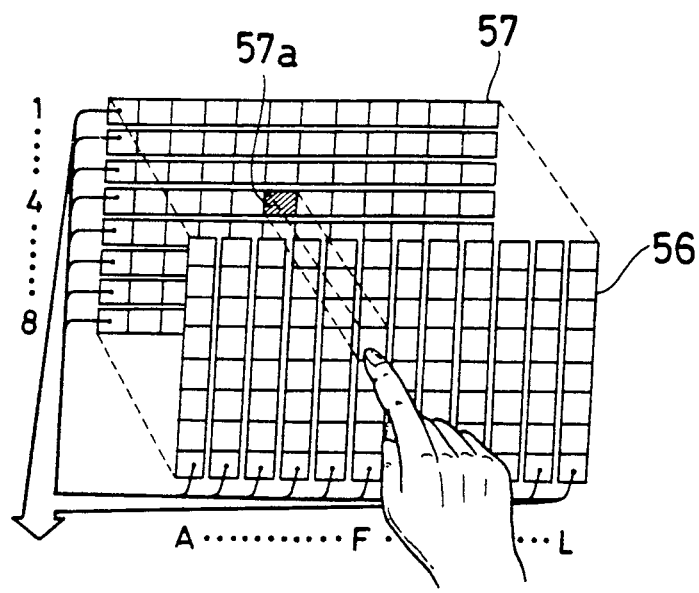
F I G. 5b
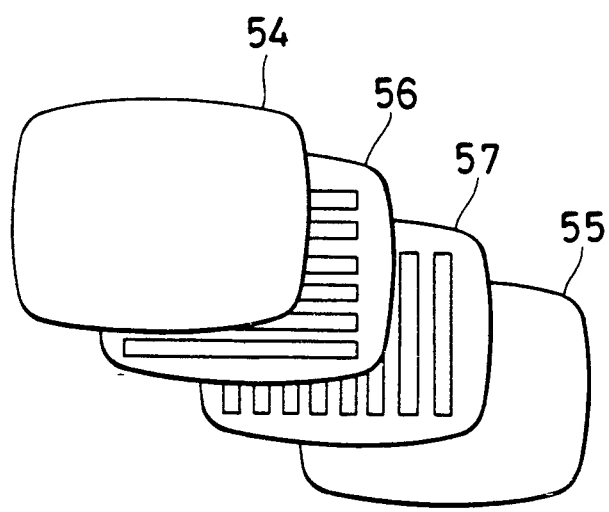

F I G. 6a
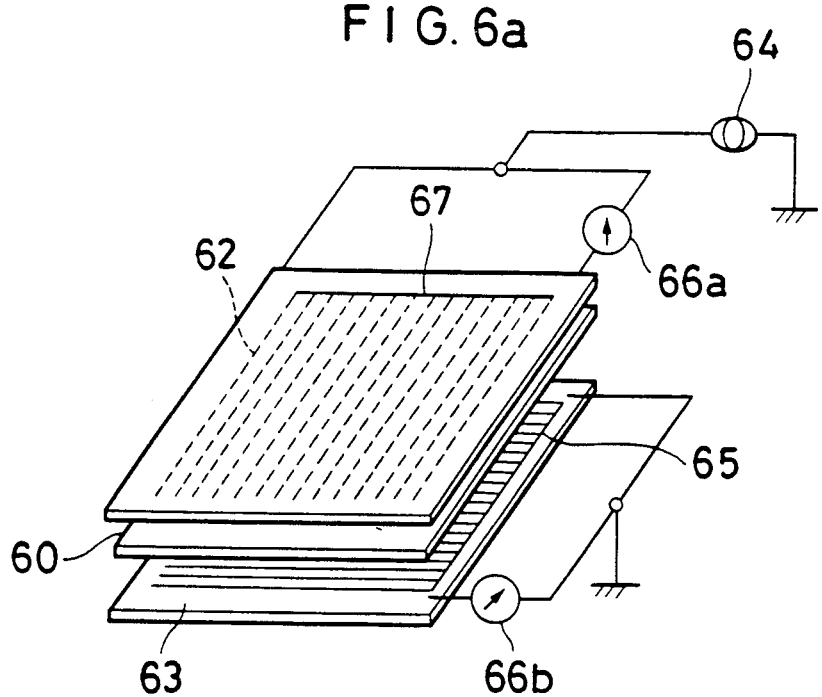
F I G. 6b
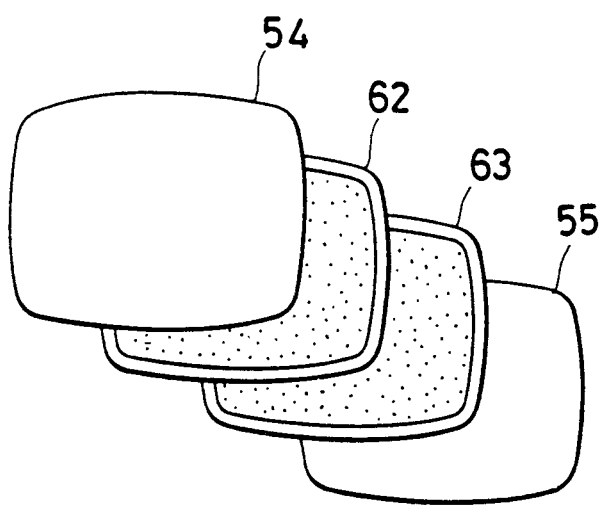

METHOD AND APPARATUS FOR RECORDING IMAGE

BACKGROUND OF THE INVENTION

1. Field of the Invention

This invention relates to a method in which the image information on an original film such as a negative film (which is hereinafter sometimes referred to as an "original") is divided into a plurality of pixels which are subjected to photometry and the main area of said original is designated, with the image information on said original being recorded on a light-sensitive material under appropriate conditions of exposure. This method is applicable not only to printers (e.g., a photographic printing apparatus) but also to user friendly copiers. The present invention also relates to a printer (e.g., a photographic printing apparatus), in particular, an enlarging printer, as well as to a user friendly copier, in particular, a copier capable of enlargement, which require only one test printing for permitting the image information on an original to be recorded enlarged under appropriate conditions of exposure.

2. Description of the Prior Art

In photographic printing, the amount of exposure is conventionally controlled in accordance with the large-area transmittance density (hereinafter abbreviated as "LATD") of an original. This LATD method which uses the transmittance density as averaged for the greater part of the area of the original is capable of determining the appropriate amount of exposure for "normal negatives", or negative films that are balanced in terms of both density and color. However, such normal negative assume only about 60% of all the negatives handled by users and the remaining 40% are negatives having scenes that are not balanced in density or color, as exemplified by negatives having a higher or lower density in the background than in the image area or negatives in which, certain colors occupy the greater part of the area.

If the LATD method is applied to such negatives that are not balanced in density or color, subject failures such as density failure or color failure often occur in the scenes that are unbalanced in density or color. With a view to dealing with these subject failures, methods and apparatuses for photographic printing have been proposed, in which a plurality of points on an original are subjected to photometry with an image sensor and average transmittance density, maximum density, minimum density, contrast and other parameters are determined for various areas, such as the upper half area, lower half area and the central area, of the original on the basis of the photometric values on those points, and the amount of correction is calculated from those characteristic values, and the amount of exposure as determined on the basis of LATD is corrected by the calculated amount of correction (see, for example, Japanese Patent Application (kokai) Nos. 23936/1977, 23938/1977 and 28131/1979).

Another method that has been proposed to achieve precise exposure control by dealing with subject failures is a "main area designation method" in which the main area of an original such as the face of a human figure, the human figure itself, and animal or a flower is designated and subjected to photometry with a suitable device such as an image sensor and the resulting photometric values are used independently or combined with the average transmittance density or LATD of the whole original to perform exposure control. This "main area designation method" is incorporated in the system described in Japanese Patent Publication No. 29412/1980 and in the system described in commonly assigned Japanese Patent Application (kokai) No. 232441/1986.

A photographic printer with a simulator is also known as a means of reducing or eliminating N.G. prints; in this type of printer, a simulated image of a finished print that is produced by processing the original with an imaging device is displayed on a monitor using a display device such as a CRT. To optimize the quality of finished print, the amount of exposure is corrected manually by the user who manipulates correction keys on the basis of the color balance and density of the simulated image.

However, the conditions of exposure determined by the methods described above are insufficient to obtain high-quality image, in such cases as enlargement from negative films where enhanced optimization of color and density is required. It has therefore been necessary for a skilled operator to examine the negative film and conduct multiple runs of test printing under the conditions estimated as a result of examination, to thereby determine appropriate conditions of exposure.

According to the method described in Japanese Patent Publication No. 29412/1980, supra, the average density A, maximum density X and contrast $\Delta$ are determined as characteristic values for the main area of an original, and a correction signal F is determined by:

$$F = K_1(-A) + K_2(X) + K_3(\Delta)$$

(where $K_1$, $K_2$ and $K_3$ are constants), and this correction signal F is used either independently or combined with a signal indicating the average transmittance density of the whole original to perform exposure control. However, a plurality of characteristic values must be determined even for the main area of the original and, furthermore, a plurality of associated coefficients must be determined empirically and statistically, whereby the precision of determining the appropriate amount of exposure is lowered.

The method described in commonly assigned Japanese Patent Application (kokai) No. 232441/1986, supra comprises the following steps: dividing the image area of an original film into a plurality of sub-areas; obtaining image information for each sub-area; by means of the methods described in Japanese Patent Application (kokai) Nos. 23936/1977, 23938/1977 and 28131/1979, supra, which are intended to determine an amount of exposure that is appropriate for each divided scene on the basis of the obtained image information on that scene, determining the amount of LATD-associated automatic correction of exposure DC as:

$$DC = a_1 D_a + b_1 D_{max} + c_1 D_{min} + d_1$$

(where Da is the LATD of the image area, Dmax is the maximum density of the divided scenes, Dmin is the minimum density of the divided scenes, and $a_1$, $b_1$, $c_1$ and $d_1$ are constants); further designating a limited area as the main area including the marginal portion that is referenced to a pointer such as the principal subject; determining the amount of correction CR in that area as:

$$CR = a_2 D_a + b_2 D_{max} + c_2 D_{min} + d_2$$

(where $a_2$, $b_2$, $c_2$ and $d_2$ are constants); and determining the appropriate corrected amount of exposure DC' from:

$$DC' = K_i DC + K_j CR$$

(where $k_i$ and $K_j$ are constants).

However, this method which uses a number of coefficients involves complicated procedures of calculation and processing; further, the constants $a_1 - d_1$ and $a_2 - d_2$ are determined empirically and statistically, and $K_i$ and $K_j$ must also be determined empirically and statistically on the basis of the number of pixels into which the image area of the original is divided, whereby the precision of determining the appropriate amount of exposure is lowered.

As mentioned above, functions comprising a number of characteristic values and coefficients are necessary to determine the appropriate amount of exposure by the prior art methods and this inevitably makes the overall procedures of calculation and processing complicated. Further, the many coefficients involved are determined empirically and statistically and the determined amount of exposure does not have sufficient precision to be applicable to enlarged printing. Hence, it has not been used as the basic amount of exposure for test printing.

Under these circumstances, in order to print a negative film, say, a 35-mm film enlarged onto a light-sensitive material of a larger size, say, a cabinet size, $8 \times 10''$ size, $10 \times 12''$ size, $14 \times 17''$ size or $18 \times 22''$ size, many runs of test printing are conducted until an appropriate amount of exposure is found, with manual correction being performed after each run. This procedure is cumbersome and is not easy to accomplish even by skilled operators. This problem is particularly serious with image recording apparatus of a type that is often operated by many unspecified laymen or beginners, such as copiers that are capable of enlarged duplication of transmission originals such as negative films. If the operator is an unskilled layman, he is not always capable of obtaining an appropriately enlarged image as a result of repeated test printing with such image recording apparatus.

BRIEF SUMMARY OF THE INVENTION

This invention has been accomplished under the circumstances described above and has as a first object providing an image recording method which comprises calculating the large-area transmittance density of an original film such as a negative film and the average transmittance density of a designated main area, determining conditions of exposure as appropriate for said original film on the basis of a linear function of the two average transmittance densities, and permitting the image information on the original film to be recorded on a light-sensitive material under the appropriate conditions of exposure. This method insures that an image having an appropriate density and color balance, particularly in the subject, can be recorded not only from an original having no subject failure but also from an original having a subject failure, especially a density failure and, hence, it can be used not only with printers but also with low-cost printers that are intended to be operated by many unskilled users.

A second object of the present invention is to provide an image recording apparatus such as a printer (e.g., a photographic printing apparatus), particularly a printer for enlargement, or a low-cost copier that is capable of enlargement and which is intended to be operated by many unskilled users. In this image recording apparatus, the large-area transmittance density of an original film such as a negative film and the average transmittance density of a designated main area are calculated, and conditions of test printing as appropriate for said original film are determined on the basis of a linear function of the two average transmittance densities, and a single run of test printing of the image information on the original film is done with a light-sensitive material under the appropriate conditions of test printing. The apparatus insures that an enlarged image having an appropriate density and color balance, particularly in the principal subject, can be recorded from any kind of original.

The first object of the present invention can be attained by a method which comprises the steps of:

performing photometry on a plurality of pixels into which an original film is divided; measuring the large-area transmittance density of said original film on the basis of the photometric values for individual pixels;

designating the main area of said original film and measuring the average transmittance density of the designated main area;

determining conditions of exposure as appropriate for said original film on the basis of a linear relationship between the basic density of exposure associated with said large-area transmittance density and the average transmittance density of the main area; and permitting the image information on said original film to be recorded on a light-sensitive material under said appropriate conditions of exposure.

Preferably, said linear relationship for determining the appropriate amount of exposure D corresponding to said appropriate conditions of exposure is expressed by:

$$D = a' \cdot D_M + b' \cdot D_O + c'$$

where $D_O$ is the basic density of exposure as the basic transmittance density $D_S$, $D_M$ is said average transmittance density of the main area, and $a'$, $b'$ and $c'$ are constants.

Preferably, said linear relationship for determining the appropriate amount of exposure D corresponding to said appropriate conditions of exposure is expressed by:

$$D = a \cdot \{D_M - b \cdot (D_O - D_{ON}) - D_{NM}\} + D_O$$

where $D_O$ is the basic density of exposure as the basic conditions of exposure associated with said large-area transmittance density $D_S$, $D_M$ is said average transmittance density of the main area, $D_{ON}$ is the basic density of exposure for a standard original film, $D_{NM}$ is the average transmittance density of main area for said standard original film, a and b are constants.

The first object of the present invention can be also attained a method of recording image which comprises the steps of:

performing photometry on a plurality of pixels into which an original film is divided;

measuring the large-area transmittance density of said original film on the basis of the photometric values for individual pixels;

designating the main area of said original film and measuring the average transmittance density of the designated main area;

determining conditions of exposure as appropriate for said original film on the basis of a linear relationship between the basic amounts of correction determined on the basis of said large-area transmittance density by referring to a standard original film, and the amounts to be added for the corrected exposure on the basis of said basic amounts of correction and said average transmittance density of the main area; and permitting the image information on said original film to be recorded on a light-sensitive material under said appropriate conditions of exposure.

Preferably, the appropriate amounts of exposure, d which are corrected by referring to a standard original film and which are determined as said appropriate conditions of exposure on the basis of said linear relationship, are expressed by the equation:

$$d = d_n + p_n \cdot D_M + q_n$$

wherein $d_n$ is the basic amounts of exposure for said original film as determined in accordance with Said large-area transmittance density $D_S$, $D_M$ is said average transmittance density of main area, and $p_n$ and $q_n$ are constants dependent on said basic amounts of exposure $d_n$.

The second object of the present invention can be attained by an apparatus which comprises:

a means of performing photometry on each of the pixels into which an original film is divided;

a means of measuring the large-area transmittance density of said original film on the basis of the photometric values for of individual pixels;

a means of designating the main area of said original films;

a means of measuring the average transmittance density of the designated main area;

a means of determining conditions for test printing said original film on the basis of a linear relationship between the basic density of exposure associated with said large-area transmittance density and the average transmittance density of the main area;

a means of permitting the image information on said original film to be test printed on a light-sensitive material under said conditions of test printing; and a means of permitting the image information on said original film to be recorded on a light-sensitive material under the appropriate conditions of exposure determined from the image produced by test printing.

Preferably, said linear relationship for determining the amount of exposure for test printing D corresponding to said conditions of exposure for test printing is expressed by:

$$D = a' \cdot D_M + b' \cdot D_O + c'$$

where $D_O$ is the basic density of exposure as the basic conditions of exposure associated with said large-area transmittance density $D_S$, $D_M$ is said average transmittance density of the main area, and a', b' and c' are constants.

Preferably, said linear relationship for determining the amount of exposure for test printing D corresponding to said conditions of exposure for test printing is expressed by:

$$D = a \cdot \{D_M - b \cdot (D_O - D_{ON}) - D_{NM}\} + D_O$$

where $D_O$ is the basic density of exposure as the basic conditions of exposure associated with said large-area transmittance density $D_S$, $D_M$ is said average transmittance density of the main area, $D_{ON}$ is the basic density of exposure for a standard original film, $D_{NM}$ is the average transmittance density of main area for said standard original film, and a and b are constants.

The second object of the present invention can be also attained an apparatus for image recording which comprises:

a means of performing photometry on each of the pixels into which an original film is divided;

a means of measuring the large-area transmittance density of said original film on the basis of the photometric values for individual pixels;

a means of designating the main area of said original film;

a means of measuring the average transmittance density of the designated main area;

a means of determining conditions for test printing said original film on the basis of a linear relationship between the basic amounts of correction determined on the basis of said large-area transmittance density by referring to a standard original film, and the amounts to be added for the corrected exposure on the basis of said basic amounts of correction and the average transmittance density of the main area;

a means of permitting the image information on said original to be test printed on a light-sensitive material under said conditions of test printing; and a means of permitting the image information on said original film to be recorded on a light-sensitive material under the appropriate conditions of exposure determined from the image produced by test printing.

Preferably, the amounts of exposure d, which are corrected by referring to a standard original film and which are determined as said conditions for test printing on the basis of said linear relationship, are expressed by the equation:

$$d = d_n + p_n \cdot D_M + q_n$$

wherein $d_n$ is the basic amounts of exposure for said original film as determined in accordance with said large-area transmittance density $D_S$, $D_M$ is said average transmittance density of the main area, and $p_n$ and $q_n$ are constants dependent on said basic amount of exposure $d_n$.

DESCRIPTION OF THE DRAWINGS

FIGS. 3a and 3b illustrate an example of the correspondence between an original film divided into pixels and the data stored in a memory;

FIG. 4 is a diaphragm showing how to use the color correcting filter assembly, the diaphram stop and the image information detecting filter assembly in the photographic printing apparatus shown in FIG. 1;

FIGS. 5a and 5b are diagrams illustrating an example of the touch panel that can be used in the photographic printing apparatus shown in FIG. 1;

FIGS. 6a and 6b are diagrams illustrating another example of the touch panel that can be used in the photographic printing apparatus shown in FIG. 1;

DETAILED DESCRIPTION OF THE INVENTION

The image forming method and apparatus of the present invention are described below in detail.

The first aspect of the present invention is an image forming method that is suitable for permitting the image information on an original film such as a negative film to be recorded on a light-sensitive material to produce a printed image finished to have an optimum density and color. According to this method, the original film is divided into a plurality of pixels which are respectively subjected to photometry and the large-area transmittance density (LATD) of the original film is calculated on the basis of the photometric values for the individual pixels; at the same time, the main area of the original film is designated and its average transmittance density is calculated on the basis of said photometric values; conditions of exposure as appropriate for the original film are determined from a linear relationship between said LATD value (or the basic density of exposure calculated from said LATD value) and the average transmittance density of the main area, and the image information on the original film is recorded on a light-sensitive material under the thus determined appropriate conditions of exposure. This method allows even unskilled operators to perform the correction of exposing conditions in a very exact and easy manner, so that principal subjects such as a human figure and his or her face can be exposed and printed at optimum density.

The second aspect of the present invention is an image recording apparatus that is suitable for obtaining a high-quality image from original films such as negative films in the case of enlargement and other situations where enhanced color and density adjustments are required. As in the first aspect, this apparatus determines appropriate conditions of exposure as conditions for test printing on the basis of a linear relationship between the basic conditions of exposure as determined from the LATD of the original film and the average transmittance density of the principal area of the film. In order to determine the appropriate conditions of exposure, the operator only needs to perform a single run of test printing under plural, say, five, conditions of exposure that are slightly differentiated from the central test printing condition that has been determined in consideration of the main area of the original film. By performing exposure under those appropriate conditions, the original film can be enlarged to produce a high-quality image having an optimum color and density in the main area.

The image recording method according to the first aspect of the present invention is described below in detail with reference to the preferred embodiment of an image recording apparatus that is shown in FIGS. 1-6 and which is operated by the method of the present invention.

Figure 1:
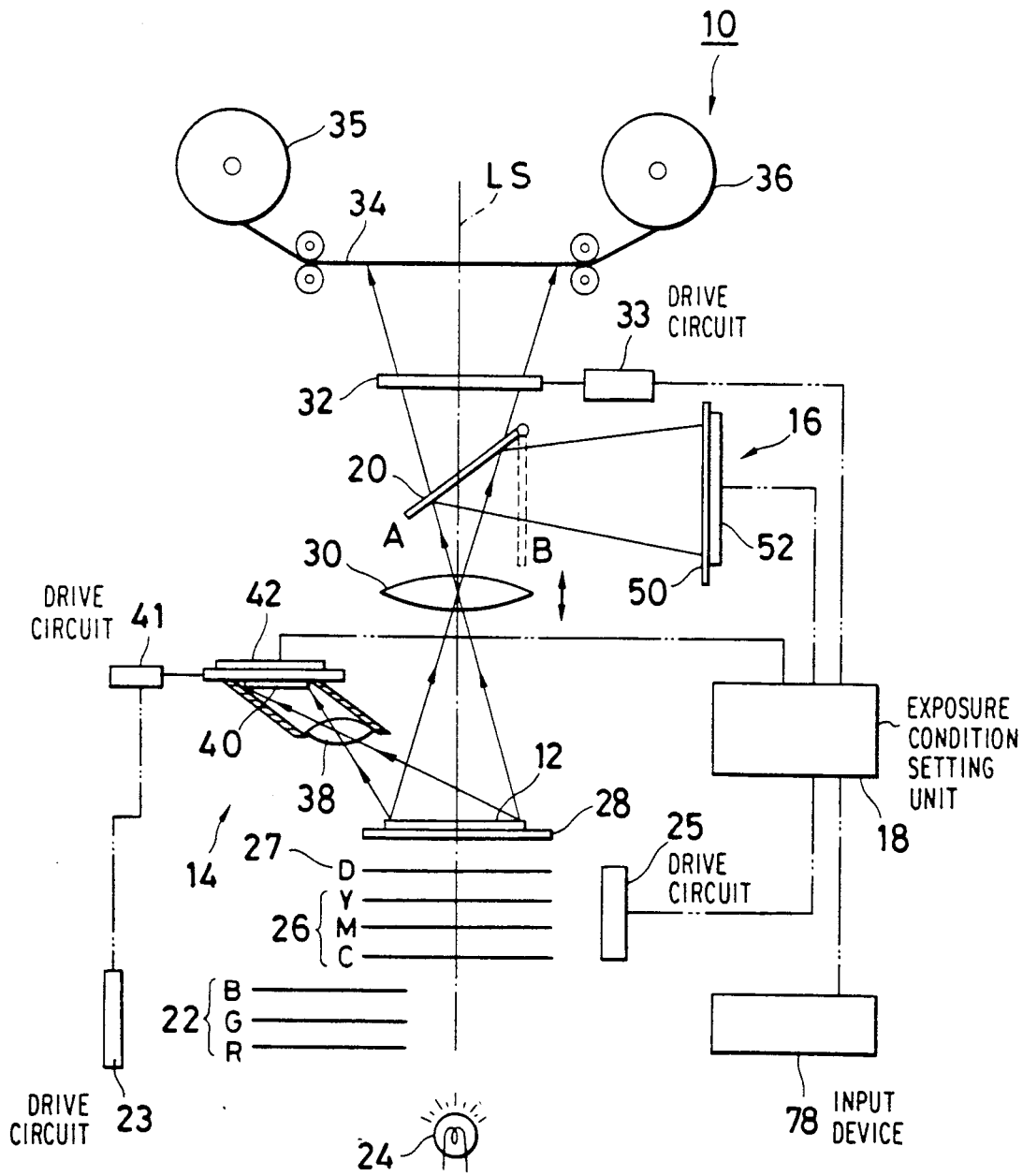
FIG. 1 is a schematic view showing the construction of an exemplary photographic printing apparatus which is operated by the image recording method of the present invention.

FIG. 1 is a schematic view showing the construction of a photographic printing apparatus which is an exemplary image recording apparatus that is operated by the image recording method of the present invention.

As shown in FIG. 1, the photographic printing apparatus generally indicated by 10 has as essential elements an image information detector 14 which detects image information from a plurality of pixels into which an original film such as a negative film 12 is divided, a main area designator 16 which designates the main area of the negative film 12, an exposure condition setting unit 18 which performs mathematical operations on the information from the image information detector 14 and the main area designator 16 in accordance with the method of the present invention, thereby setting appropriate conditions of exposure taking the main area into consideration, a pivotal mirror 20 for changing the optical path, and an image information reading filter assembly 22.

The photographic printing apparatus 10 may include all other elements that are necessary to complete a photographic printing apparatus; in the example shown in FIG. 1, the apparatus includes, in the direction of the travel of light, a light source 24, a color correcting filter assembly 26 and a density correcting diaphragm stop 27 that are positioned downstream of the image information reading filter assembly 22, a negative carrier 28 that transports the negative film 12 to the printing section and which fixes it in that section, a lens unit 30, a black shutter 32 and a drive circuit 33 therefor, a supply reel 35 for supplying a photographic material 34 to the back side (downstream) of the black shutter 32, and a take-up reel 36 for winding up the supplied photographic material 34.

The negative film 12 transported to the printing section along the negative carrier 28 is adapted to be illuminated with the light source 24 either through the color correcting filter assembly 26, which is composed of filters for three primary colors, yellow (Y), magenta (M) and cyan (C), and the density correcting diaphragm stop 27 or through the image information reading filter assembly 22 which is composed of blue (B), green (G) and red (R) filters one of which is inserted into the optical path LS in an image information reading mode alternately with the filter assembly 26 and the diaphragm stop 27. In an image recording mode (i.e., photographic printing mode), the filter assembly 22 and the optical path changing mirror 20 are extracted from the optical path LS so that the light of transmission from the negative film 12 that has passed through the filter assembly 26 and the diaphragm stop 27 passes through the lens unit 30 and the black shutter 32 to fall upon the photographic material 34. The photographic material 34 which is wound onto the supply reel 35 is delivered therefrom and wound up by the take-up reel 36 in synchronism with the transport and stop of the negative film 12. In accordance with the appropriate conditions of exposure that have been set by the exposure condition setting unit 18 on the basis of the information from the image information detector 14 and the main area designator 16, the color filter assembly 26 and the diaphragm 27 are adjusted and the black shutter 32 is opened by the drive circuit 33 so that exposure of the photographic material 34 is performed under those appropriate conditions of exposure to achieve the desired photographic printing of the image information onto the photographic material 34.

The image information detector 14 is an integral assembly of a lens unit 38, a two-dimensional image sensor 40, an associated drive circuit 41 and a substrate 42. The image information detector 14 is located near the negative film 12 and is inclined from the optical axis LS connecting the light source 24 and the negative film 12. The lens unit 38 is provided ahead of the two-dimensional image sensor 40 for focusing transmitted light and the optical axis of the lens unit 38 is in substantial alignment with the center of the filter assembly 22 and the negative film 12. The substrate 42 is attached to the back side of the detector 14 for mounting an image information processing circuit composed of ICs and other devices.

Figure 2:
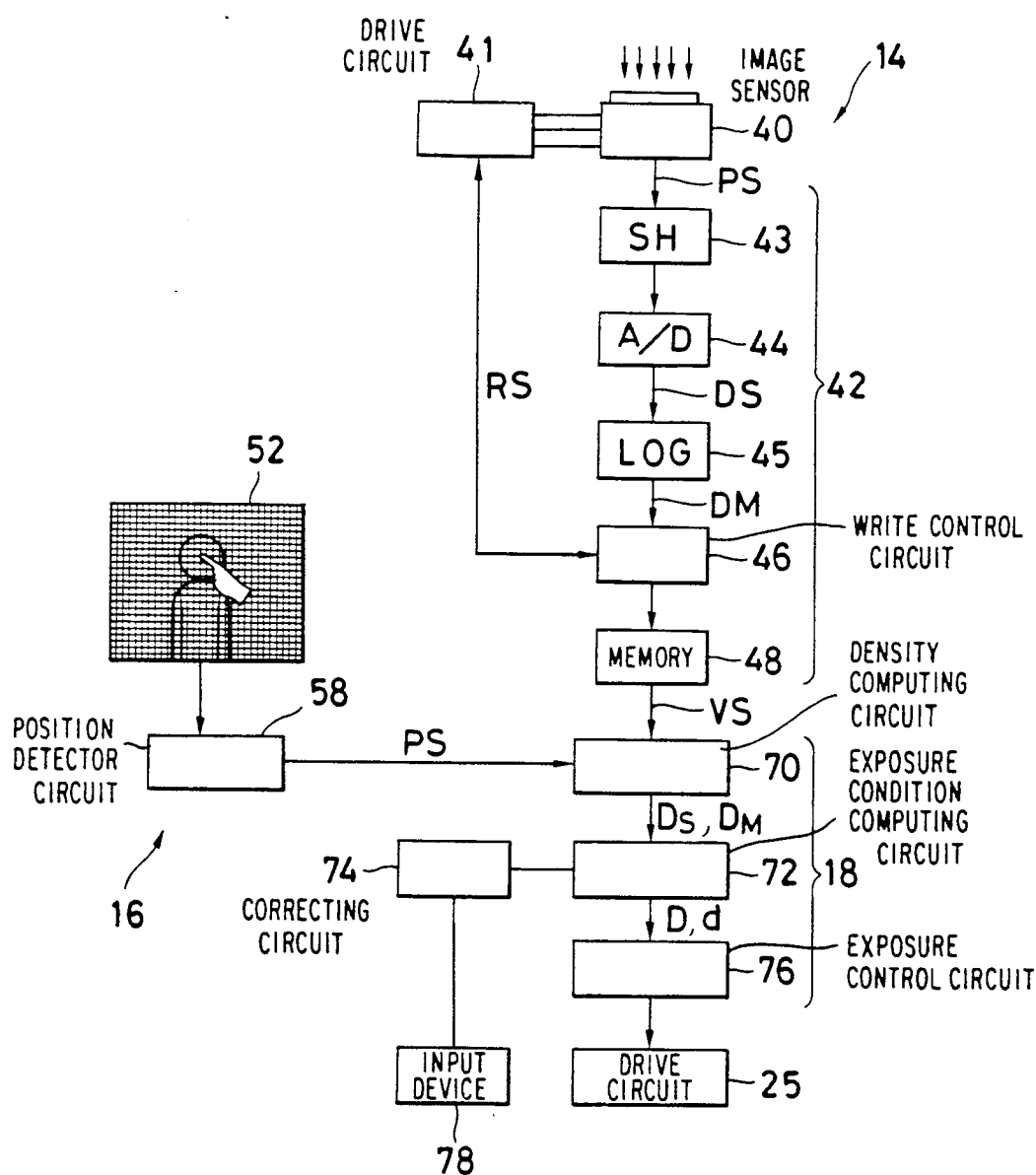
FIG. 2 is a block diagram showing an example of the circuit configuration of the photographic printing apparatus shown in FIG. 1.

As shown in FIG. 2, the substrate 42 has provided thereon, in the direction of picture signal transmission from the image sensor 40, a sample-and-hold circuit (SH) 43, an A/D converter 44, a logarithmic converter circuit 45, a write control circuit 46 and a memory 48. The image sensor 40 is driven by a drive signal from the drive circuit 41 and the light applied to the focusing section of the image sensor 40 is produced as a picture signal PS from an output register. The output picture signal PS is sampled and held in the sample-and-hold circuit 43 at a given sampling period and the sampled information is converted to a digital signal DS in the A/D converter 44. The digital signal DS from the A/D converter 44 is fed into the logarithmic converter circuit 45 where it is converted to a logarithmic density signal $D_M$, which is thereafter passed through the write control circuit 46 to be written into the memory 48.

The two-dimensional image sensor 40 is so adapted as to be capable of performing photometry on a multiple of small aligned pixels 12a into which the negative film 12 is divided as shown in FIG. 3a. In a typical case, a frame (36mm×24 mm) of a 135 film is divided into 72×48 pixels. As shown in FIG. 3a, photometry can be performed by successively scanning the pixels along the scanning line SL to cover the entire part of the negative film 12.

In the case where the image information on the negative film 12 is detected and stored for each pixel in the image information detector 14 having the construction described above, the filter assembly 26 and the diaphragm stop 27 are removed from the optical path LS as shown in FIG. 4, and the drive circuit 23 is actuated to alternately insert one of the B, G and R filters in the separation filter assembly 22 into the optical path LS (in FIG. 4, filter B is inserted), whereby the B, G or R component of the white light from the light source 24 is transmitted to illuminate the negative film 12 to insure that the image information on the yellow, magenta or cyan layer of the negative film 12 which corresponds to B, G or R color, respectively, will be supplied into the image sensor 40. In response to a predetermined drive signal applied from the drive circuit 41, the two-dimensional image sensor 40 receives the B, G or R light (in FIG. 4, B light) that has been transmitted through the negative film 12 in the printing section and through the lens unit 38. As shown in FIG. 3a, the two-dimensional image sensor 40 is so adapted as to scan successively the many small aligned pixels 12a along the scanning line LS until the entire part of the image area of the negative film 12 is covered. When the scanning of the entire part of the image area is completed, picture signals PS are successively produced from the output register in the image sensor 40 to be fed into the SH circuit 43 and the A/D converter 44 where they are converted to digital signals DS, which are then stored in the memory 48 in the manner shown in FIG. 3b (they aligned to correspond to the individual pixels 12a and are associated with the digital values indicating the densities of the negative film 12).

An advantage of the system described above is that the image information detector 14 can be incorporated, with its optical axis inclined, in a common photographic printing apparatus. Even in this case, the light-receiving surface of the two-dimensional image sensor 40 remains parallel to the negative film 12, so an undistorted correct image of the negative film 12 will form on the two-dimensional image sensor 40. This is the result of application of camera adjustments in photography and in order to simplify the mechanism of the printing apparatus, the optical axis of the lens for the two-dimensional image sensor 40 is deliberately adapted not to cross the center of the image area at right angles and yet the desired image information can be detected in a correct manner.

The memory 48 having thus stored digital values for the individual pixels on the negative film 12 or density values for the individual pixels that are related to the three primary colors, the digital values can be read from the memory 48 for the respective pixels on the negative film 12 and subsequently used. Accordingly, if density values as shown in FIG. 3b are determined for the three primary colors B, G and R and stored in the memory, the stored values can be read as required and subjected to mathematical or other operations in the exposure condition setting unit 18 to determine the appropriate conditions of photographic printing and exposure or the necessary amount of correction. Further, the image information detector 14 is so adapted as to store the image information that has been detected on the basis of the pixels that cover the entire part of the image area and this allows the image information to be detected in a correct manner.

In the case shown in FIG. 1, the main area designator 16 is composed of a screen 50 and a touch panel 52. The optical path changing mirror 20 which is capable of pivoting to shift between two positions A and B is allowed to pivot to position A, whereby the mirror is inserted into the optical path to bend it by nearly 90 degrees so that the image of the negative film 12 projected onto the screen 50 as a viewer. By means of the touch panel 52 formed as a layer on the screen 50, the operator can externally point to a desired position in the projected image (e.g., a principal subject such as a human figure) using, for example, a finger.

The touch panel 52 (consisting of a touch screen, a touch sensor and a see-through finger touch input device) permits the operator to enter information merely by touching the screen with a finger as he or she looks at the screen. In the case of using transparent electrodes, the touch panel 52 may be of a digital system as shown in FIGS. 5a and 5b or an analog system as shown in FIGS. 6a and 6b. In the case of a digital touch sensor, transparent movable electrodes 56 in strip form and transparent fixed electrodes 57 which are also in strip form are arranged to cross at right angles and placed between a filter 54 and a substrate 55 as shown in FIG. 5b. The individual strips are spaced apart by a very small air gap to prevent shorting. When a certain area of one electrode 56 is depressed under a small pressure (10-20 g) with a finger or by some other means as shown in FIG. 5a, it is brought into contact with the opposite electrode 57a, which then conducts and a position detector circuit 58 including a limit circuit (see FIG. 2) produces position information (X-and Y-addresses) PS. An analog touch sensor is the same as the digital touch sensor in that two transparent, thin-film electrodes 62 and 63, as separated by a spacer 60 typically made of pressure-sensitive conductive rubber, are placed between the filter 54 and the substrate 55 as shown in FIG. 6b. However, the analog touch sensor differs from the digital touch sensor in that the uniform conductivity of the electrodes 62 and 63 is utilized to detect a change in current that occurs at the point of contact between two electrodes. As shown in FIG. 6a, a DC current from a constant-voltage source 64 is applied to the electrodes 62 and 63 and the current flowing at one end of a detecting resistor 65 on the electrode 63 is measured with an ammeter 66a whereas the current flowing at one end of a detecting resistor 67 on the electrode 62 is measured with an ammeter 66b, whereby the position pointed by a finger or some other means is detected. Besides transparent electrodes, various other means may be employed to operate the touch panel 52, such as infrared radiation, ultrasonic waves and static capacity.

The size of the main area to be designated, namely, the size of individual areas defined by the movable electrode strips 54 and the fixed electrode strips 55 in the touch panel 52 are not limited to any values and may be appropriately determined in accordance with such factors as the sizes of the negative film 12 and the light-sensitive material 34 and enlargement ratio; as a guide, the size of the main area may be 2 mm by square if the negative film has a size of 24×36 mm.

As shown in FIG. 2, the exposure condition setting unit 18 comprises the following components: a density computing circuit 70 that reads density information from the memory 48 that is associated with each color for each of the pixels on the negative film 12 and which computes the average transmittance density of the designated main area (which is hereinafter referred to as the "density of the main area") on the basis of the main area position information (X- and Y-addresses) from the main area designator 16, as well as the LATD, or the average transmittance density for each color of the entire part or the large area of the negative film 12; an exposure condition computing circuit 72 which performs a linear calculation on the density of the main area and the LATD to determine the conditions of exposure that permit the subject of interest included within the main area to be exposed appropriately, namely, the absolute amounts of density and color or the necessary amounts of correction; a correcting circuit 74 which adds various terms of correction to the computation of exposure conditions in circuit 72 as required by such factors as the size of the principal subject, its color shade, color density, the type of negative film used and the user's preference; and an exposure control circuit 76 which controls the color filter assembly 26 and the diaphragm stop 27 to match the appropriate conditions of exposure.

The density computing circuit 70 reads from the memory 48 the photometric value for each color of each of the pixels on the negative film 12 and computes the average transmittance density (LATD) for each of the colors of a predetermined large-area region, as well as the density of the main area, or the average transmittance density of a predetermined area that centers at the position information (X- and Y-addresses) from the main area designator 16.

The exposure condition computing circuit 72 computes the appropriate conditions of exposure for the principal subject included within the main area on the basis of the linear relationship between LATD (R, G and B) $D_S$ and the density of the main area $D_M$ (R, G and B). The circuit 72 may compute the appropriate conditions of exposure directly from LATD (R, G and B) $D_S$ and the density of the main area $D_M$, but more preferably, basic conditions of exposure, in particular, a basic density of exposure $D_O$, is first determined from LATD $D_S$ and such basic densities of exposure $D_O$ for Y, M and C are corrected by the density of the main area $D_M$.

If the value of LATD or LATD photometric gain is written as Ds and the value of transmittance density or photometric gain of a standard negative film as $D_N$, the basic density of exposure $D_O$ can be determined by the following equation:

$$D_O = \tfrac{1}{3} \cdot C_1 \cdot (D_N - D_s) + K + C_2 + R$$

where $C_1$ is a coefficient due to color sloping, color correction, preadjustments, etc.; K represents the amounts of density and color correction provided by the user, correction keys in another correcting system, and function keys; $C_2$ represents negative balance, paper balance, lens balance and master balance; and R represents data entered into ROM or some other memory (not shown).

The basic density of exposure $D_O$ may be determined either as an absolute density or as a density of correction referenced to the standard negative film.

Using color negative films each containing 140 frames, the present inventors determined from the values of LATD (R, G and B) $D_S$ the basic amounts of correction $d_n$ (Y, M and C), namely, the basic densities of exposure referenced to a standard negative film, and classified those negative films into 11 types ranging from −5 (to be overexposed) to +5 (to be underexposed). The numerals −5 to +5 shall represent the number of steps by which the density key needs to be depressed in order to adjust the amount of exposure for the standard negative film.

At the same time, the present inventors calculated the density $D_M$ of a main area, say, a predetermined region of a principal subject such as the face of a human figure, for each of the negative films under test. In the experiment, the main area was a square of 2×2 mm on each negative film the average transmittance density of that main area was $D_M$. Since the face of human figure was selected as the main area, the density of the main area $D_M$ was represented by green (G) density.

The negative films under test were exposed with the basic amounts of correction $d_n$ calculated solely on the basis of LATD and printed on appropriate light-sensitive materials, which were subsequently developed, fixed and washed with water to obtain color prints.

In order to check for the occurrence of any density failure in the finished color prints, they were evaluated by a person who was a skilled photographic printing evaluator. As for the negative films having a density failure, the skilled evaluator determined the amount of correction of exposure $\Delta d$ that had to be further added to finish those negative films to color prints of the same size as the previously finished color prints.

For all the negative films, the basic amount of correction $d_n$ was plotted on the horizontal axis and the amount to be added for corrected exposure $\Delta d$ on the vertical axis, with the average of the density of main area $D_M$ being determined for each area of acceptable negative films (films containing extremely small or large human faces in the main area were excluded). The results are shown in Table 1, from which the present inventors found the following: as the basic amount of correction $d_n$ varied from +5 (for underexposure) to −5 (for overexposure), the density of main area increased irrespective of whether the negative film contained a density failure or it was a normal negative; and the density of main area $D_M$ increased as the amount to be added for corrected exposure $\Delta d$ varied from −5 to +5.

Based on these findings, the present inventors obtained the following observation: the amount of exposure $\Delta d$ to be further added to the basic amount of correction $d_n$ determined from LATD is a function of $d_n$ and the density of main area $D_M$ as is expressed by $f(d_n, D_M)$, and when $p_n$ and $q_n$ are used as constants dependent on the basic amount of correction $d_n$, the additional amount for corrected exposure $\Delta d$ can be expressed as a linear function of the density of main area $D_M$.

These relationships can be mathematically expressed by the following equation:

$$\Delta d = f(d_n, D_M) = p_n D_M + q_n.$$

Hence, the corrected amount of exposure that is appropriate for a given film, d, can be expressed by:

$$d = d_n + \Delta d = d_n + p_n D_M + q_n \quad (I).$$

Therefore, according to the present invention, the values of $p_n$ and $q_n$ that depend on the basic amount of correction $d_n$ (e.g. depending on the classification of negative films into 11 types ranging from −5 to +5) are preliminarily stored in a memory unit such as RAM (e.g. LUT), and the exposure condition computing circuit 72 reads $p_n$ and $q_n$ in accordance either with the basic density of exposure $D_O$ calculated from the value of LATD $D_S$ as computed in the density computing circuit 70 or with the basic amount of correction $d_n$ referenced to a standard negative film, and the appropriate amount of exposure d for a negative film of interest is computed by equation (I) on the basis of the density of main area $D_M$ from the density computing circuit 70.

Further, from the data of $d_n$ shown in Table 1 and the relationship between $D_M$ and $\Delta d$, one can also see that the basic density of exposure determined from LATD has a linear relationship with the density of main area.

Consequently, if the basic density of exposure as determined from the LATD $D_S$ of a negative film of interest is written as $D_O$, with the density of main area in that negative film, the density of exposure for a standard negative film and the density of main area in the standard negative film being respectively written as $D_M$, $D_{ON}$ and $D_{NM}$, the appropriate density of exposure D which corresponds to the appropriate amount of exposure can be determined by the following linear relation:

$$\begin{aligned} D &= a\{D_M - b(D_0 - D_{ON}) - D_{NM}\} + D_0 \quad \text{(II)} \\ &= aD_M + (1-ab)D_0 + a(bD_{ON} - D_{NM}) \\ &= a' D_M + b' D_0 + c' \end{aligned}$$

where a, b, a', b' and c' are constants.

The values of $D_{ON}$ and $D_{NM}$ are uniquely determined by the negative film and light-sensitive material used and hence can be stored preliminarily in a suitable memory device such as RAM. Therefore, the exposure condition computing circuit 72 to be used in the present invention may be so adapted as to determine the appropriate density of exposure D for a negative film by the equation set forth above on the basis of the basic density of exposure $D_O$ and the density of main area $D_M$ of that negative film. In other words, the exposure condition computing circuit 72 may adopt any configuration as long as it is capable of calculating the appropriate conditions of exposure from the basic density of exposure on the basis of LATD or from the linear relationship between the basic amount of correction and the density of main area.

The correcting circuit 74 shown in FIG. 2 is inserted to add, as required, suitable terms of correction to the computation of the appropriate density of exposure or the appropriate amount of correction in the exposure condition computing circuit 72. The correcting circuit is not absolutely necessary but it is preferably used since it permits correction data to be entered from an external input device 78 or some other suitable means by taking into account various parameters including the size of a principal subject in the main area, its color shade, color density, the type of negative film used and the user's preference.

For example, if the size of the face of a human figure in the main area is added as parameter to equation (I), the latter may be rewritten as:

$$d = d_n + a_n D_M + b_n + \alpha$$

where $\alpha$ is a constant depending on the size of the human face.

If it is necessary to make corrections taking into account the difference in the density of a flesh color (e.g.

TABLE 1

| $\Delta d$ | $d_n$ | | | | | | | | | | |
|---|---|---|---|---|---|---|---|---|---|---|---|
| | −5 | −4 | −3 | −2 | −1 | 0 | +1 | +2 | +3 | +4 | +5 |
| −5 | | | | | 0.40 | | | | | | |
| −4 | | | | | | 0.38 | | | 0.30 | | |
| −3 | | | 0.83 | | | | 0.35 | | | | |
| −2 | | | | 0.66 | | | | | 0.39 | 0.38 | 0.37 |
| −1 | 0.89 | | | 0.80 | 0.65 | 0.65 | 0.50 | | | 0.38 | |
| 0 | | | 0.82 | | 0.81 | | | 0.62 | 0.54 | 0.46 | 0 42 | 0.38 | 0.31 |
| +1 | 1.03 | | | 0.88 | | 0.77 | 0.63 | | 0.62 | | |
| +2 | | | | | 0.85 | 0.88 | | | | 0.59 | 0.54 |
| +3 | | | 0.99 | | | | | 0.66 | | | 0.60 |
| +4 | | | | | | | | | | | |
| +5 | | | | | | 1.09 | | | | | | due to a racial difference), that parameter $\beta$ may be added to the density of main area $D_M$ in equation (I), which is then rewritten as:

$$d = d_n + a_n(D_M + \beta) + b_n.$$

In another case, in order to cancel the difference in the type of negative films from one lot of manufacture to another, $\gamma$ or the base density of each negative film may be subtracted from the density of main area $D_M$ in equation (I), which is then rewritten as:

$$d = d_n + a_n(D_M - \gamma) + b_n.$$

Needless to say, the correcting circuit 74 may also be used to compensate for the difference in the type of light-sensitive materials used and for the difference in the subject of interest in the main area (whether it is a human figure, a vehicle or a plant) and to apply the present invention to the processing of reversal films. In such cases, various terms of correction can be added, as appropriate, to the computational formulas that are employed in the exposure condition computing circuit 72.

The exposure condition setting unit 18 first reads video signal VS from memory 48 in the image information detector 14 and computes the values of LATD $D_S$ (R, G and B) in the density computing circuit 70. At the same time, the main area, or a principal subject, of the image on the negative film 12 is pointed with a finger or by some other suitable means which touches the touch panel 52 in the main area designator, whereupon a position indicating (X- and Y-addresses) signal PS detected with the position detector circuit 58 is entered into the density computing circuit 70 and the density of main area $D_M$ is computed from the video signal VS and the position indicating signal PS.

In the next place, the exposure condition computing circuit 72 determines the basic density of exposure $D_O$ or basic amount of correction $d_n$ from the values of LATD $D_S$ and further determines the appropriate density of exposure D or appropriate corrected amount of exposure d by the equation (II) or (I). The thus determined D or d is sent into the exposure control circuit 76 which then supplies the drive circuit 25 with signals that control the Y, M and C color filter assembly 26 and the diaphragm stop 27 to match the appropriate conditions of exposure.

In the operation of the system shown in FIGS. 1 and 2, the opening of the diaphragm stop 27 need not be varied at all times. Usually, densities are changed in photographic printing apparatus by adjusting the amount of insertion of Y, M and C filters. Hence, the opening of the diaphragm stop need be varied only in limited cases, that is, when an extreme underexposure or overexposure is to be performed.

The density D and amount of exposure d which are used as parameters in the present invention can be considered with respect to three primary colors, Y, M and C or R, G and B.

Thus, according to the present invention, even if the image on the negative film 12 has density failure as in the case of a scene showing a human figure illuminated with rear light to produce a difference in brightness between the main area (i.e., the face of the human figure as a principal subject) and the background, the operator only needs to designate the main area by pointing it on the touch panel 52 with a finger or by some other means. Using the computed density of the main area, exposure can be performed under appropriately corrected conditions to permit the negative film to be printed in such a way that the face of the human figure as the principal subject will produce an optimum density on the print. Needless to say, the image on a normal negative film having no subject failures such as density failure can be finished to provide an optimum density for a principal subject, in particular the main area, on the print.

The foregoing description assumes the use of screen 50 which serves as a direct viewer of the image on a negative film and touch panel 52, with the position of the main area of the image being designated by depressing the touch panel 52 with a finger or by some other means. This is not always the case of the present invention and any embodiment will do if it is capable of producing information that designates the position of the main area. In one case, the image information detected with the image information detector 14 or by means of a separate image reader is read either immediately or after being stored in the memory 48 and then displayed on the monitor unit such as a CRT, with the main area being designated with a cursor or by some other means to obtain information that designates the position of the main area. The image information on the negative film to be displayed on the monitor unit may be the image itself on the yet to be image-processed negative film or it may be a simulated image produced by processing under suitable conditions such as the basic conditions of exposure determined from LATD.

In the photographic printing apparatus 10 shown in FIGS. 1 and 2, the image information detector 14 detects the image information across the negative film with a single image sensor 40 and, after the detected image information is stored temporarily in the memory 48, the values of LATD $D_S$ (R, G and B) and the density of main area $D_M$ based on the position information from the touch panel 52 are determined. However, this is not always the case of the present invention and other embodiments may be adopted; for example, the light of transmission from the negative film 12 may be received by two separate image sensors, one for detecting LATD and the other for detecting the density of main area, so that the value of LATD $D_S$, as well as the basic amount of exposure $D_O$ based on the value of LATD, and the density of main area $D_M$ can be directly determined. In this case, a memory may or may not be used to store image information.

As described above in detail, according to the first aspect of the present invention, the image information on an original film such as a negative film can be recorded imagewise on a light-sensitive material to finish a print having optimum density and color in the following manner: using the values of large-area transmittance density (LATD) and further, the basic density of based on LATD, as well as the average transmittance density of the main area, the appropriate density of exposure which permits a principal subject such as a human figure or his/her face to be exposed and printed at optimum density can be set in an easy way (namely, by using the relationship between the two parameters); as a result, the operation of correcting the amount of exposure of original films on the basis of photometric values of LATD, which operation has heretofore been extremely difficult to perform other than by skilled operators, can be accomplished by beginners in an easy and efficient manner without compromising the required high accuracy and precision.

Accordingly, an image recording apparatus such as a photographic printing apparatus that is operated by the method of the present invention features high operational precision and yet offers the advantage of low cost since it employs very simple procedures of computation compared to the prior art photographic printing and other image recording apparatus.

Further, the method of the present invention which is simple to practice and which can be operated at low cost has the added advantage that it is applicable to copiers and other image recording apparatus that are intended to be operated not by skilled users but by many unspecified beginners.

The image recording apparatus which is the second aspect of the present invention is described below in detail on the basis of the preferred embodiment shown in FIGS. 7-9.

Figure 7:
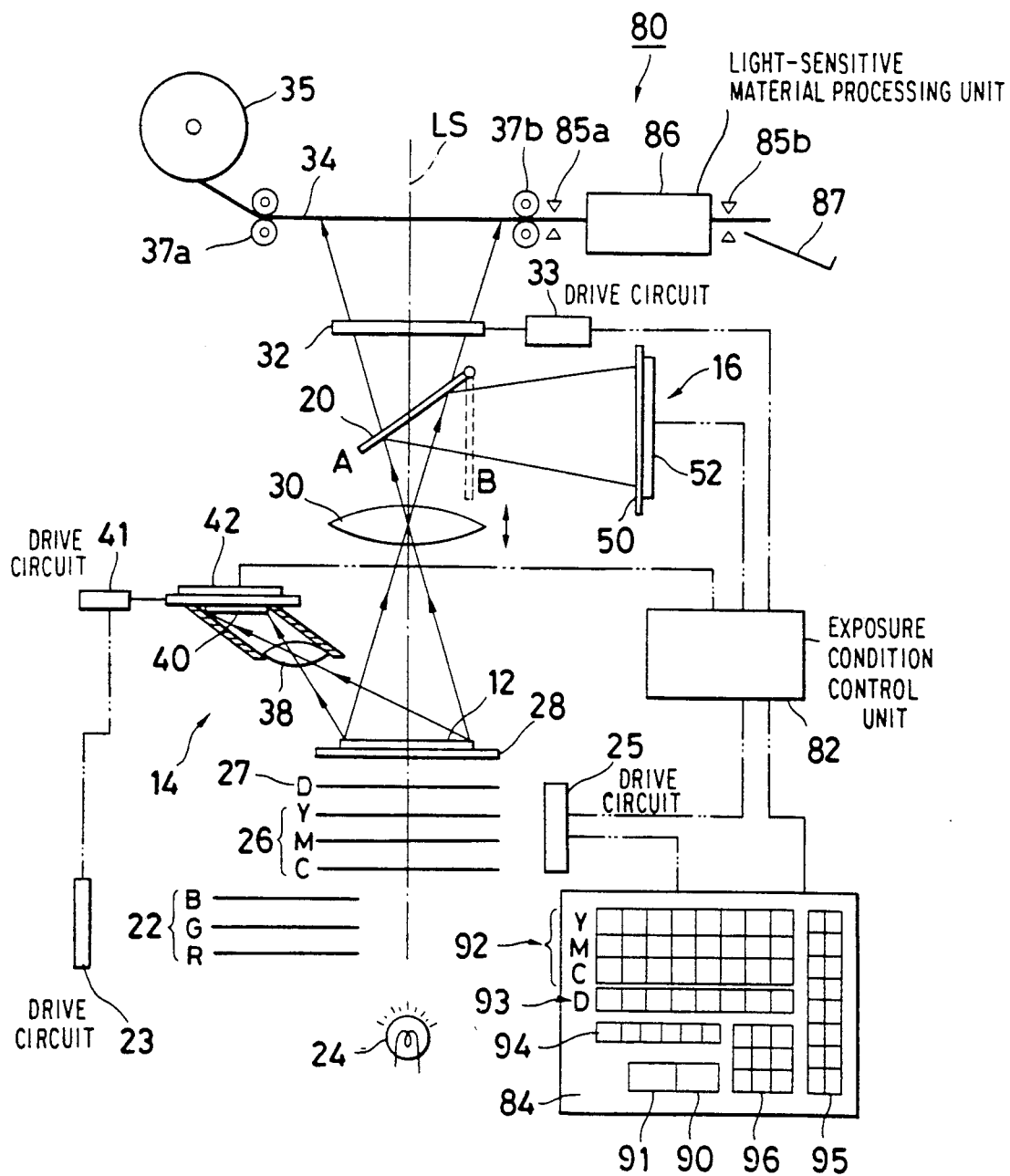
FIG. 7 is a schematic view showing an exemplary photographic printing apparatus incorporating the image recording apparatus of the present invention.

FIG. 7 is a schematic view showing the construction of a photographic printing apparatus which is an example of the image recording apparatus of the present invention. FIG. 8 is a block diagram showing an example of the control circuit in the apparatus shown in FIG. 7.

Except for the exposure condition control unit, manipulation unit and the light-sensitive material processing unit, the photographic printing apparatus shown in FIG. 7 has the same construction as the system shown in FIG. 1, so like components are identified by like numerals and will not be discussed in detail.

As shown in FIG. 7, the photographic printing apparatus generally indicated by 80 is adapted to perform enlargement and has as essential elements an image information detector 14 which detects image information from a plurality of pixels into which an original film such as a negative film 12 is divided, a main area designator 16 which designates the main area of the negative film 12, an exposure condition control unit 82 which, in response to the information from the image information detector 14 and the main area designator 16, performs mathematical operations to set conditions of test printing taking the main area of the negative film into consideration, and which sets and controls appropriate conditions of exposure on the basis of the result of test printing, and a manipulating unit 84 for instructing manual correction of colors and density, entry of various kinds of data and various other operations. The photographic printing apparatus 80 is characterized by having a test printing mode.

In addition to the optical unit shown in FIG. 1, the photographic printing apparatus 80 shown in FIG. 7 also has a supply reel 35 from which a photographic material 34 is delivered to a selected exposing position in the back (downstream) of a black shutter 32, as well as a light-sensitive material processing unit 86 for developing and fixing the light-sensitive material 34 after exposure. The photographic material 34 wound onto the supply reel 35 is adapted to be transported to the exposing position and stopped there in synchronism with the transport and stop of the negative film 12 by means of two roller pairs 37a and 37b which define the exposing position. In accordance either with the conditions of test printing automatically set by the exposure condition control unit 18 on the basis of the information from the image information detector 14 and the main area designator 16 or with the appropriate conditions of exposure that are determined in consideration of the results of test printing, the color filter assembly 26 and diaphragm stop 27 are adjusted and the black shutter 32 is opened by activating the drive circuit 33, so that the photographic material 34 resting at the exposing position is exposed under the predetermined conditions of test printing or under the appropriate conditions of exposure. Thereafter, the exposed light-sensitive material 34 is transported by two roller pairs 37a and 37b, has its rear edge cut off by a cutter 85a, and subsequently developed, fixed and washed with water and dried in the processing unit 86. If necessary, the processed light-sensitive material 34 may be cut into individual frames by a cutter 85b before it is received by a tray 87.

The exposure condition control unit 82 has the same construction as the exposure condition setting unit shown in FIGS. 1 and 2 and it similarly comprises a density computing circuit 70, an exposure condition computing circuit 72, a correcting circuit 74 and an exposure control circuit 76. The only difference is that what is set and controlled by the procedure of computation in the exposure condition setting unit 18 shown in FIGS. 1 and 2 is appropriate conditions of exposure for obtaining a desirably finished print, whereas what is set and controlled by identical procedures of computation in the exposure condition control unit 82 shown in FIGS. 7 and 8 are conditions of test printing for insuring an appropriate or generally appropriate exposure of the main area of a negative film which test printing is conducted prior to final printing.

The exposure condition computing circuit 72 in the exposure condition control unit 82 computes conditions of test printing a principal subject in the main area of the negative film using the linear relationship between LATD (R, G, B) $D_S$ and the density of main area $D_M$. The procedure of computing conditions of test printing in the exposure condition computing circuit 72 is completely identical to the procedure of computing appropriate conditions of exposure in the first aspect of the present invention. Therefore, the computed conditions of test printing are appropriate conditions of exposure that are sufficient to achieve satisfactory image quality in ordinary prints. They are also appropriate for obtaining enlarged prints or other prints that require particularly high image quality. Even if the computed conditions of test printing deviate from the appropriated conditions of exposure, they are still so close to the latter that optimum conditions of exposure can be identified by a single run of test printing. To state more specifically, the corrected amount of exposure d which has been determined by equation (I) in the exposure condition computing circuit 72 through the same procedure as already described above is identical or very close to the appropriate corrected amount of exposure. Thus, by using that amount as the corrected amount of exposure for test printing d in the embodiment under consideration, the appropriate corrected amount of exposure can be obtained by a single run of test printing even in cases such as enlargement where high precision of color and density adjustments is required.

Needless to say, instead of determining the corrected amount of exposure for test printing d, the exposure condition computing circuit 72 in the embodiment under consideration may be adapted to determine by equation (II) the density of exposure for test printing D which corresponds to the amount of exposure for test printing. Further, any other embodiments are conceivable as long as the conditions of test printing can be calculated from the value of LATD and the density of main area.

The correcting circuit 74 shown in FIG. 7 is inserted to add, as required, suitable terms of correction to the computation of the density of exposure for test printing or the corrected amount of exposure for test printing in the exposure condition computing circuit 72. The correcting circuit is not absolutely necessary but it is preferably used since it permits correction data to be manually entered from the manipulation unit 84 to be described below by taking into account various parameters including the size of a principal subject in the main area, its color shade, color density, the type of negative film used and the user's preference. Needless to say, the correcting circuit 74 may also be used to compensate for the difference in the type of light-sensitive materials used and for the difference in the subject of interest in the main area (whether it is a human figure, a vehicle or a plant) and to apply the present invention to the processing of reversal films. In such cases, various terms of correction can be added, as appropriate, to the computational formulas that employed in the exposure condition computing circuit 72.

The manipulation unit 84 has a print mode key 90, a test print mode key 91, color correcting keys 92 for entering the amount of manual color correction, density correcting keys 93 for entering the amount of manual density correction, function keys 94 for permitting both amounts of manual density and color correction to be entered to correct a specific scene in negative films having a subject failure, manipulation keys 95 for entering various operational instructions, and data input keys 96 for entering various kinds of channel data including enlargement ratio, the type of negative film used, the type of light-sensitive material used and the size of final print.

Having the basic construction described above, the photographic printing apparatus which is an example of the image forming apparatus according to the second aspect of the present invention is operated in the following manner.

After setting the negative film 12 on the negative carrier 28 in the photographic printing apparatus 80 shown in FIG. 7, various kinds of data including enlargement ratio, the type of negative film 12, the type of light-sensitive material used and the size of final print are entered by manipulating data input keys 96 and the lens unit 30 is moved along the optical axis in accordance with the selected enlargement ratio. With various conditions set properly, the test print mode key 91 is depressed, whereupon filters B, G and R in the image information reading filter assembly 22 are alternately inserted into the optical path LS and density information for each color is read from multiple pixels by means of the image information detector 14 in the manner already described in connection with the first aspect of the present invention. The color density information thus read is stored in the memory 48 and the filter assembly 22 is extracted from the optical path LS after the reading of image information is completed. At the same time, the pivotal mirror 20 shifts to position A to be inserted into the optical path LS. When the main area of the image on the negative film 12 projected onto the screen 50 in the main area designator 16 is pressed with a finger or by some other means, the touch panel 52 is accordingly depressed to designate the position of the main area as already described in connection with the first aspect.

Thereafter, the pivotal mirror 20 shifts to position B so that it is retracted from the optical path LS.

Figure 8:
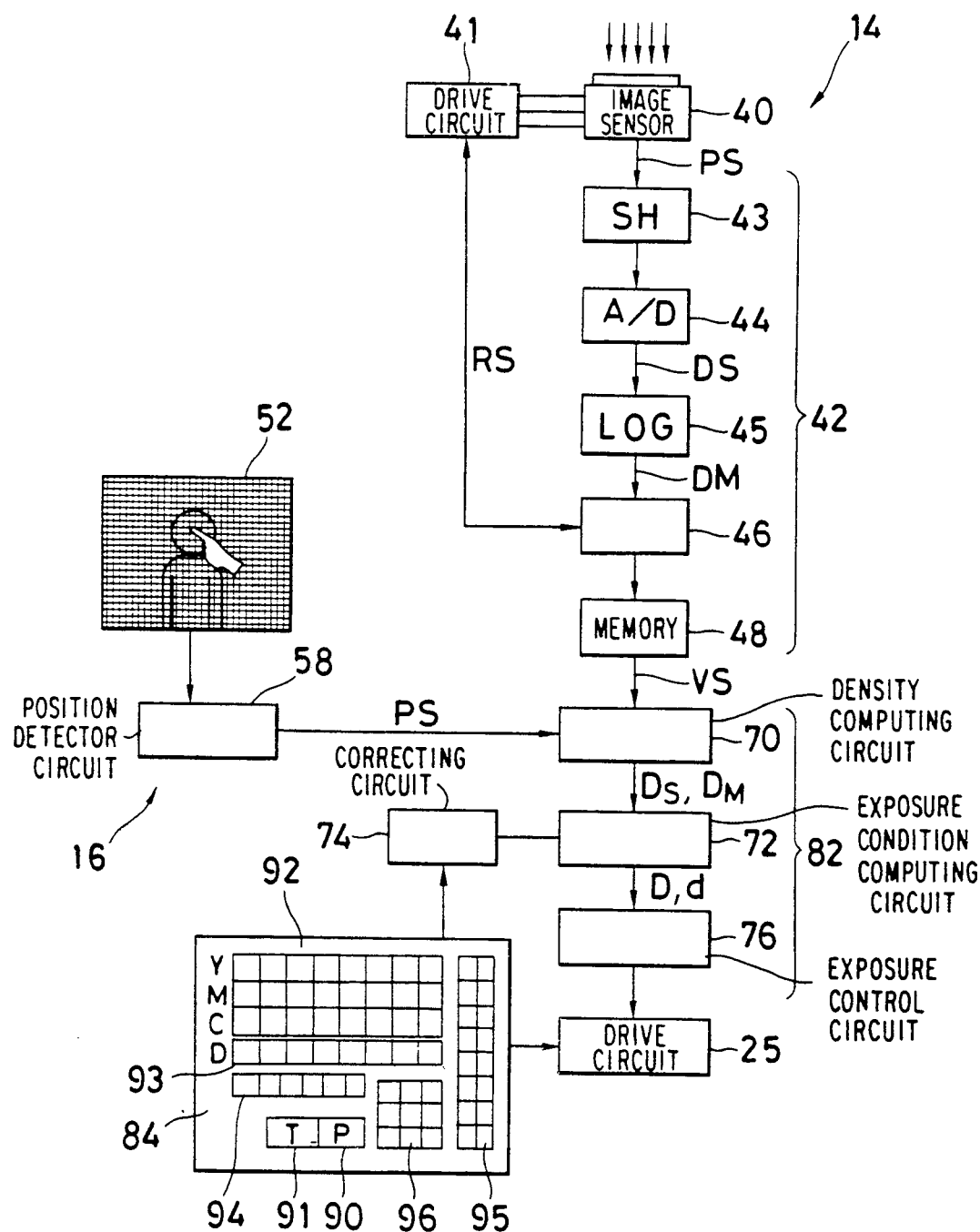
FIG. 8 is a block diagram showing an example of the circuit configuration of the photographic printing apparatus shown in FIG. 7.

As shown in FIG. 8, the exposure condition control unit 82 first reads a video signal VS from the memory 48 in the image information detector 14 and computes the values of LATD $D_S$ (R, G and B) in the density computing circuit 70. At the same time, the main area, or a principal subject, of the image on the negative film 12 is pointed with a finger or by some other suitable means which touches the touch panel 52 in the main area designator 16, whereupon a position indicating (X- and Y-addresses) signal PS detected with the position detector 58 is entered into the density computing circuit 70 and the density of main area $D_M$ is computed from the video signal VS and the position indicating signal PS.

In the next place, the exposure condition computing circuit 72 determines the basic density of exposure $D_O$ or the basic amount of correction $d_n$ from the values of LATD $D_S$ and further determines the density of exposure for test printing D or the corrected amount of exposure for test printing d by the equation (II) or (I). The Thus determined D or d is sent into the exposure control circuit 76 which then supplies the drive circuit with signals that control the Y, M and C color filter assembly 26 and the diaphragm stop 27 to match the appropriate conditions of test printing.

In the operation of the system shown in FIGS. 7 and 8, the opening of the diaphragm stop 27 need not be varied at all times. Usually, densities are changed in photographic printing apparatus by adjusting the amount of insertion of Y, M and C filters. Hence, the opening of the diaphragm stop need be varied only in limited cases, that is when an extreme underexposure or overexposure is to be performed.

Thus, according to the second aspect of the present invention, not only in the case where a normal negative film having no density failure is to enlarged but also in the case where the negative film 12 to be enlarged has density failure as with a scene showing a human figure illuminated with rear light to produce a difference in brightness between the main area (i.e., the face of the human figure as a principal subject) and the background, the operator only needs to designate the main area by pointing it on the touch panel 52 with a finger or by some other means. Using the computed density of the main area, test printing can be conducted under reasonably corrected conditions and, as a result, the appropriate conditions of exposure that permit the negative film to be printed enlarged in such a way that the face of the human figure as the principal subject will produce an optimum density on the final print can be determined by a single run of test printing.

Figure 9:
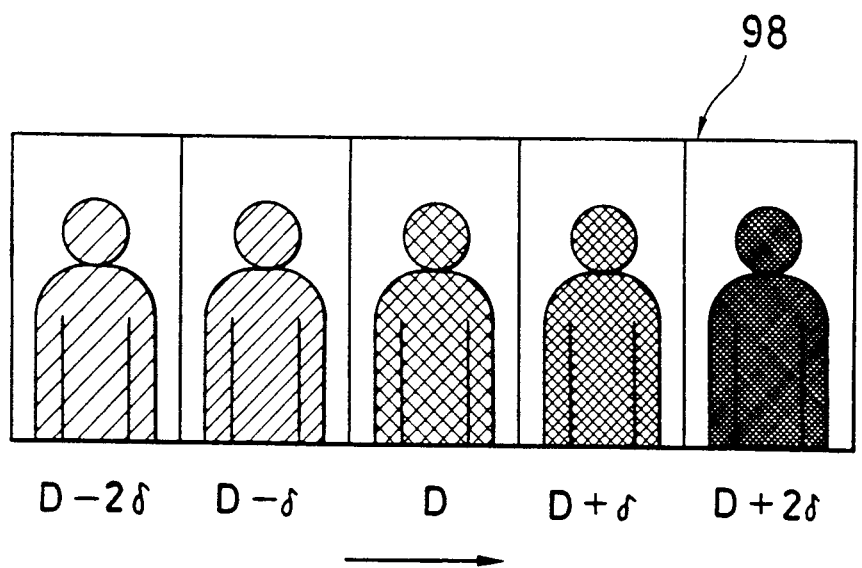
FIG. 9 is a diagram showing an example of the test print obtained with the image recording apparatus of the present invention.

When the color filter assembly 26 and the diaphragm 27 are thus set to one of the conditions for a single run of test printing that are to be varied with the density of exposure for test printing D used at the central value (for example, if they are initially set at point $D-2\delta$ as shown in FIG. 9), the black shutter 32 is opened for a predetermined time and by a width that corresponds to the main area, whereby the light-sensitive material 34 is exposed. Suppose here that the conditions for a single run of test printing are of five types, $D-2\delta$, $D-\delta$, $D$, $D+\delta$, and $D+2\delta$. Then, the light-sensitive material 34 is transported by successive predetermined widths and in order to unsure matching with one of those conditions, the color filter assembly 26 and the diaphragm 27 are set and the shutter 32 is opened at each of the successive settings, whereby exposure is automatically repeated. When five cycles of exposure are completed, the exposed light-sensitive material 34 is transported by means of the roller pairs 37a and 37b and has its rear edge cut off by the cutter 85a and further sent to the processing unit 86 where it is developed, fixed, washed with water and dried, producing a test print as shown by 98 in FIG. 9 which is then received by the tray 87.

As already mentioned, the conditions of test printing adopted here are the conditions of exposure determined by taking the main area of the negative film 12 into account and hence they are very close to the appropriate conditions of exposure. In other words, one of the five images on the test print 98 is always the appropriate high-quality image even if it has been enlarged. Therefore, using that particular image, the appropriate conditions of exposure can be easily determined.

After thus determining the appropriate conditions of exposure, the necessary amounts of manual correction are entered by manipulating color correcting keys 92 (Y, M and C) and density correcting keys 93 (D) to produce colors and densities that match those appropriate conditions of exposure. Then, the drive circuit 25 is operated to set the color filter assembly 26 and the diaphragm stop 27 and, subsequently, the print mode key 90 is pressed to open the shutter 32 for exposing the light-sensitive material 34. The exposing light-sensitive material 34 is processed in the processing unit 86, whereby a high-quality print image (which may be an enlarged print) is obtained that has an appropriate color and density.

The variable amount of correction $\delta$ may be automatically set on the basis of the LATD or $D_M$ (density of main area) of the negative film. Alternatively, it may be a predetermined constant value. If desired, a desired value of $\delta$ may be designated by the user. There are also no limitations on the number of conditions for test printing to be used for exposure in a single run of test printing, the type of those conditions or the way to determine them. Those conditions may be preliminarily set or they may be designated by user selection. Exposure to be performed in a single run of test printing under plural conditions (five conditions in the example described above) is preferably performed automatically but, if necessary, it may be performed manually by manipulation on keys 95.

The area of the negative film 12 to be exposed onto the light-sensitive material 34 during test printing may be variable in size as long as it has the designated main area in its center, and various sizes of the area can be selected depending on a specific need.

In the present invention, the main area can be selected from among principal subjects including a human figure, his/her face, a vehicle, an animal and a flower. If particular principal subject occupies a large proportion of the original film, the conditions of exposure determined from the values of LATD may be used as the central values for the conditions of test printing.

In the example described above, test printing is performed in such a way that only density is varied with the density of exposure for test printing being used as the center value. If desired, density may be varied in combination with color.

As already described in connection with the first aspect of the present invention, the image on the negative film itself or a simulated image obtained by processing it on the basis of LATD may be displayed on a monitor unit such as CRT. In either case, the main area can be designated using a cursor or a mouse to obtain position indicating information. If the simulated image to be displayed on a monitor unit is such that it has been obtained by simulating the conditions of test printing, a plurality of such simulated images may be subjected to test printing to determine an optimum image and, hence, appropriate conditions of exposure.

As described above in detail, according to the second aspect of the present invention, the image information on an original film such as a negative film can be recorded imagewise on a light-sensitive material -to finish a print having optimum density and color in the following manner: on the basis of the values of large-area transmittance density (LATD) and, further, the basic density of exposure based on LATD, as well as the average transmittance density of the main area, the density of exposure for test printing is set and used as one of the conditions for test printing; even in situations where strict conditions of exposure are required as in the case of enlargement or producing many prints as of postcards, only a single run of test printing need be conducted under those conditions for test printing, whereby strict and appropriate conditions of exposure can be determined.

Accordingly, the operation of correcting the amount of exposure of original films on the basis of photometric values of LATD in the case of enlargement or producing many prints, which operation has heretofore been extremely difficult to perform other than by skilled operators, can be accomplished by beginners in an easy and efficient manner without compromising the required accuracy and precision.

Hence, the image recording apparatus of the present invention which can be operated easily and at low cost has the added advantage that it is applicable to copiers and other image recording apparatus that are intended to be operated not by skilled operators but by many unspecified beginners.

While the method and apparatus for recording image according to the present invention have been described on the foregoing pages with reference to the photographic printing apparatus shown in FIGS. 1-8, it should be understood that the present invention is by no means limited to this particular embodiment and that it is also applicable with advantage to any types of image recording, forming and duplicating apparatus that are capable of permitting the image information on original films (e.g., negative films and reversal films) to be recorded imagewise described and shown in the specifications and drawings of commonly assigned Japanese Patent Application Nos. 62781/1989 and 62782/1989. In short, various modifications and design changes can be made without departing from the spirit and scope of the present invention.

What is claimed is:

1. A method of recording image which comprises the steps of:
    performing photometry on a plurality of pixels into which an original film is divided;
    measuring the large-area transmittance density of said original film on the basis of the photometric values for individual pixels;
    designating the main area of said original film and measuring the average transmittance density of the designated main area;
    determining conditions of exposure as appropriate for said original film on the basis of a linear relationship between the basic density of exposure associated with said large-area transmittance density and the average transmittance density of the main area; and permitting the image information on said original film to be recorded on a light-sensitive material under said appropriate conditions of exposure.

2. A method according to claim 1 wherein said linear relationship for determining the appropriate amount of exposure D corresponding to said appropriate conditions of exposure is expressed by:

$$D = a' \cdot D_M + b' \cdot D_O + c'$$

where $D_O$ is the basic density of exposure as the basic density of exposure associated with said large-area transmittance density $D_S$, $D_M$ is said average transmittance density of the main area, and $a'$, $b'$ and $c'$ are constants.

3. A method according to claim 1 wherein said linear relationship for determining the appropriate amount of exposure D corresponding to said appropriate conditions of exposure is expressed by:

$$D = a \cdot \{D_M - b \cdot (D_O - D_{ON}) - D_{NM}\} + D_O$$

where $D_O$ is the basic density of exposure as the basic conditions of exposure associated with said large-area transmittance density $D_S$, $D_M$ is said average transmittance density of the main area, $D_{ON}$ is the basic density of exposure for a standard original film, $D_{NM}$ is the average transmittance density of main area for said standard original film, a and b are constants.

4. A method of recording image which comprises the steps of:

performing photometry on a plurality of pixels into which an original film is divided;

measuring the large-area transmittance density of said original film on the basis of the photometric values for individual pixels;

designating the main area of said original film and measuring the average transmittance density of the designated main area;

determining conditions of exposure as appropriate for said original film on the basis of a linear relationship between the basic amounts of correction determined on the basis of said large-area transmittance density by referring to a standard original film, and the amounts to be added for the corrected exposure on the basis of said basic amounts of correction and said average transmittance density of the main area; and permitting the image information on said original film to be recorded on a light-sensitive material under said appropriate conditions of exposure.

5. A method according to claim 4 wherein the appropriate amounts of exposure, d which are corrected by referring to a standard original film and which are determined as said appropriate conditions of exposure on the basis of said linear relationship, are expressed by the equation:

$$d = d_n + p_n \cdot D_M + q_n$$

wherein $d_n$ is the basic amounts of exposure for said original film as determined in accordance with said large-area transmittance density $D_S$, $D_M$ is said average transmittance density of main area, and $p_n$ and $q_n$ are constants dependent on said basic amounts of exposure $d_n$.

6. An apparatus for image recording which comprises:

means for performing photometry on a plurality of pixels into which an original film is divided, said means for performing photometry comprising a two-dimensional image sensor;

a main area designator for designating a main area of said original film;

a density computing circuit for measuring a large-area transmittance density of said original film on the basis of photometric values for the individual pixels, and measuring an average transmittance density of the main area designated with said main area designator;

an exposure condition computing circuit for determining conditions for test printing said original film on the basis of a linear relationship between a basic density of exposure associated with said large-area transmittance density and the average transmittance density of the main area; and a photographic printing apparatus for permitting image information on said original film to be recorded on a light-sensitive material under exposure conditions for test printing and under appropriate exposure conditions determined from an image produced by said test printing.

7. An apparatus according to claim 6 wherein said linear relationship for determining the amount of exposure for test printing D corresponding to said conditions of exposure for test printing is expressed by:

$$D = a' \cdot D_M + b' \cdot D_O + c'$$

where $D_O$ is the basic density of exposure as the basic conditions of exposure associated with said large-area transmittance density $D_S$, $D_M$ is said average transmittance density of the main area, and $a'$, $b'$ and $c'$ are constants.

8. An apparatus according to claim 6, wherein said linear relationship for determining the amount of exposure for test printing D corresponding to said conditions of exposure for test printing is expressed by:

$$D = a \cdot \{D_M - b \cdot (D_O - D_{ON}) - D_{NM}\} + D_O$$

where $D_O$ is the basic density of exposure as the basic conditions of exposure associated with said large area transmittance density $D_S$, $D_M$ is said average transmittance density of the main area, $D_{ON}$ is the basic density of exposure for a standard original film, $D_{NM}$ is the average transmittance density of main area for said standard original film, and a and b are constants;

9. An apparatus according to claim 6, wherein said photographic printing apparatus comprises a light source, a lens unit and a manipulation unit.

10. An apparatus for image recording which comprises:

means for performing photometry on a plurality of pixels into which an original film is divided, sand means for performing photometry comprising a two-dimensional image sensor;

a main area designator for designating a main area of said original film;

a density computing circuit for measuring a large-area transmittance density of said original film on the basis of photometric values for the individual pixels, and measuring an average transmittance density of the main area designated with said main area designator;

an exposure condition computing circuit for determining conditions for test printing said original film on the basis of a linear relationship between basic amounts of correction determined on the basis of said large-area transmittance density by referring to a standard original film, and amounts to be added for the corrected exposure determined on the bases of said basic amounts of correction and the average transmittance density of the main area; and a photographic printing apparatus for permitting image information on said original film to be recorded on a light-sensitive material under exposure conditions for test printing and under appropriate exposure conditions determined from an image produced by said test printing.

11. An apparatus according to claim 10 wherein the amounts of exposure d, which are corrected by referring to a standard original film and which are determined as said conditions for test printing on the basis of said linear relationship, are expressed by the equation:

$$d = d_n + p_n \cdot D_M + q_n$$

wherein $d_n$ is the basic amount of exposure for said original film as determined in accordance with said large-area transmittance density $D_S$, $D_M$ is said average transmittance density of the main area, and $p_n$ and $q_n$ are constants dependent on said basic amount of exposure $d_n$.

12. An apparatus according to claim 10, wherein said photographic printing apparatus comprises a light source, a lens unit and a manipulation unit.

* * * * *